Figure 1:
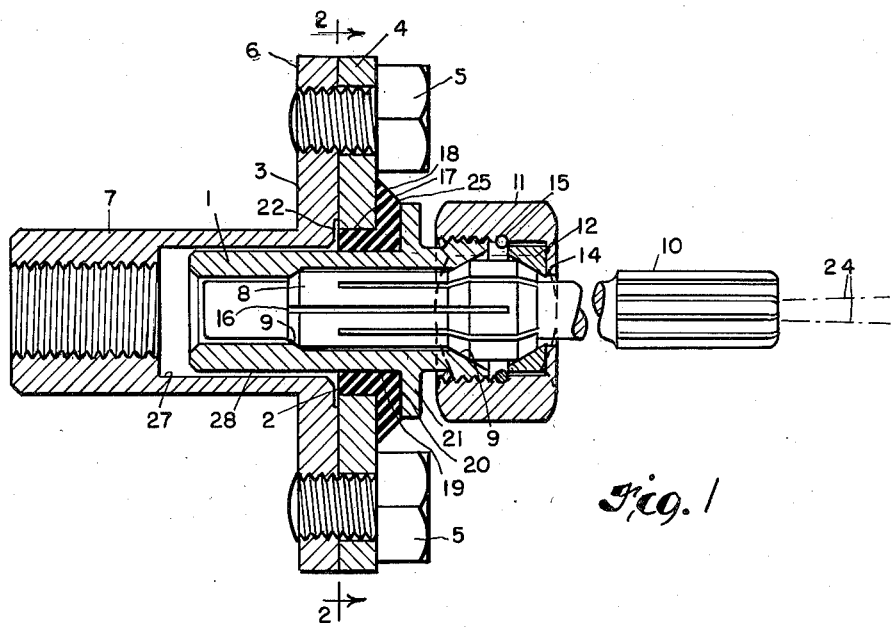

April 3, 1951     W. H. EICHELMAN     2,547,522
FLOATING TOOL HOLDER

Filed Nov. 13, 1947

INVENTOR.
WILLIAM H. EICHELMAN
BY
Oberlin & Limbach
ATTORNEYS.

Patented Apr. 3, 1951

2,547,522

UNITED STATES PATENT OFFICE 2,547,522

FLOATING TOOLHOLDER

William H. Eichelman, Westlake, Ohio, assignor to Milton L. Benjamin, Shaker Heights, Ohio Application November 13, 1947, Serial No. 785,601

9 Claims. (Cl. 279—16)

The present invention relates generally as indicated to a floating tool holder, and more especially to a holder so formed that the cutting tool supported thereby may partake of angular and parallel aligning movement with respect to a workpiece being operated upon.

The necessity or desirability for providing for such aligning movement arises as for example in cases where a second operation is to be performed on the workpiece, viz. reaming, tapping, etc. of a drilled or bored hole therein. It is a well known fact that in automatic screw machines and other machines, the axis of such second operation tool may be eccentric or angularly misaligned with respect to the position which the first operation tool had in relation to the workpiece, such eccentricity or misalignment being attributable to any of several reasons among which are inaccuracy in the indexing movement of the machine and inaccuracy in the set-up of the tools on their chucks in the machine. It is evident that without a floating holder, such misalignment, among other things, increases tool breakage, causes the tools to take uneven cuts whereby to induce chatter and vibration of the machine, and causes uneven distribution of cutting loads on the tools thus requiring more frequent grinding and replacement thereof.

Accordingly, one of the primary objects of this invention is to provide an improved floating tool holder in which the tool carried thereby is aligned during its operation on the workpiece with the tool which performed the preceding operation to thus avoid the aforesaid detrimental results obtained in the absence of such floating holder.

Another object is to provide a holder of the character indicated in which a resilient element of rubber or rubber-like material is interposed between the tool holding member and the shank member by which the holder as a whole is supported on the machine.

Another object is to provide a floating tool holder in which the aforesaid resilient element in the sole connecting means between said holding and shank members, there being no metal-to-metal engagement between said members or between the tool carried by the holding member and the shank member.

Still another object is to provide a floating tool holder in which said resilient element is connected as by bonding or otherwise to said holding and shank members and in which said members are so shaped as to preclude severance of the connections of said resilient element therewith.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
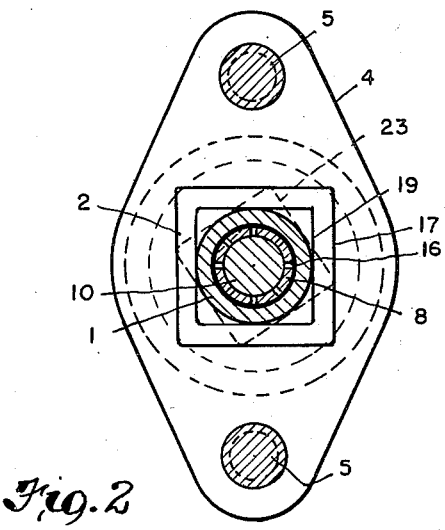

In said annexed drawing:

Fig. 1 is a cross-section view diametrically through one form of holder embodying the present improvements; and Fig. 2 is a cross-section view taken substantially along the line 2—2, Fig. 1.

Referring now to the drawing, there is illustrated therein a holder which essentially comprises a tool holding member 1 resiliently connected by a rubber or rubber-like element 2 to a shank member 3, said members 1 and 3 bearing loose telescoped relation to one another and said resilient element 2 being interposed in the annular space between said members and respectively bonded or otherwise adhered thereto.

Said shank member 3, although herein illustrated as comprising a plate 4 connected as by bolts 5 to a flanged part 6 having a cylindrical projection 7 adapted for connection in well known manner to the appropriate portion of a machine, is to be regarded as merely exemplary or typical, it being understood that said plate 4 and part 6 may optionally be integral and such projection 7 tapered (with or without a tang at its end) or otherwise shaped to fit various machines such as engine lathes, turret lathes, automatic screw machines, drill presses, tapping machines, and other single and multiple spindle machines.

Said tool holding member 1, like shank member 3, is only exemplified herein and as illustrated comprises a contractible collet 8 formed with cam surfaces 9 engageable with like surfaces in member 1 whereby relative inward movement of said collet into said member effects contraction of the former into frictional gripping engagement with the shank of a tool 10 (herein a reamer). The means herein shown for effecting inward movement of said collet includes a nosepiece 11 having threaded engagement with said holding member and a nose ring 12 within said nose-piece having its opposite faces respectively engaging an inturned flange 14 in said nosepiece and the outer end of said collet, a snap ring 15 being disposed in an undercut formed in said nose-piece for retaining said nose ring within said nose-piece. To render said collet readily and uniformly contractible it is provided with a plurality of axially extending slots 16 alternately commencing from one end and terminating short of the other end. Other satisfactory tool gripping means associated with member 1 which are well known in the art include a set screw in said member bearing against the shank of the tool, a tapered socket in said member wedgedly receiving a tapered shank on the tool, a multiple jaw chuck on said member, an expanding arbor on said member, etc.

Referring now more particularly to said resilient element 2, the same is preferably of L-shaped radial cross-section as shown with the axially and radially disposed surfaces 17 and 18 thereof bonded or otherwise adhered to similarly disposed surfaces on plate 4 and axially and radially disposed surfaces 19 and 20 thereof likewise connected to member 1, the surface 20 engaging the abutting surface of a radially projecting flange 21 formed on said member 1. Said part 6 is formed with a counterbore 22 for a purpose which will presently be made clear.

As best illustrated in Fig. 2, the axially disposed surfaces 17 and 19 of said resilient element and the corresponding aperture through plate 4 and the periphery of member 1 respectively connected thereto are of non-circular cross section of relative size and shape such that under severe abnormal torsional strains, relative rotation of said members 1 and 2 is positively arrested by engagement of the peripheral wall of member 1 with the wall of such aperture as indicated by the dotted line 23, such engagement occurring prior to shearing of the bonds of said resilient element with said member 1 and plate 4.

It will now be apparent that with a holder as described above, the tool 10 together with the member 1 in which it is gripped, will be able to partake not only of angular movement as indicated by the dot-dash lines 24 but movement parallel to the axis of said tool as well. Furthermore, by reason of the relatively large mass of resilient material in the area 25 between flange 21 and plate 4 said tool and thus said member 1 can shift axially of member 3 a limited amount as determined by the distance between the bottom wall of counterbore 22 in part 6 and the end of the non-circular surface of member 1, the diameter of bore 27 in part 6 being smaller than the diagonal dimension of such non-circular cross-section portion of said member 1. Thus the tool is also resiliently supported against axial movement whereby breakage thereof by shock compressive stresses is minimized. The portion 28 of member 1 to the left of the left hand edge of element 2 is preferably cylindrical so that there is no interference thereof with bore 27.

In relatively moving the floating tool holder herein described and a workpiece which has been previously drilled or otherwise formed, it can be seen that if the tap, reamer, or like tool carried by the holder is axially misaligned with respect to such drilled hole, the resilient element 2 will be operative to permit such tool to engage the workpiece and to assume a coaxial position relative thereto whereby all of the difficulties heretofore encountered by such misalignment are effectually eliminated. The complete absence of metal-to-metal engagement between the shank of the holder and the tool gripping member connected to said shank assures free resilient movement of the latter to assume proper alignment. Furthermore, by reason of the novel means for preventing shearing of the bonds of the shank and tool holding members with the interposed resilient element, the useful life of the holder as a whole is greatly enhanced.

Other modes of applying the principle of the invention may be employed, change being made as regards the details described, provided the features stated in any of the following claims, or the equivalent of such, be employed.

I therefore particularly point out and distinctly claim as my invention:

1. In a floating tool holder, the combination of shank and tool holding members loosely fitted out of contact one within the other for relative axial, radial, angular, and rotative movements, and a resilient element of rubber-like material interposed between and bonded to said members respectively and constituting the sole means for securing said members together and for yieldably opposing all of the aforesaid relative movements of said members.

2. In a floating tool holder, the combination of shank and tool holding members loosely fitted one within the other for relative rotation, said members defining therebetween an annular space comprising outer and inner walls of non-circular cross-section and of such relative size that, upon predetermined relative rotation of said members, portions of such walls engage each other whereby to arrest further relative rotation of said members, and a resilient element in such space engaging such outer and inner walls and yieldably opposing relative rotation of said members to a position with portions of such walls engaging each other.

3. In a floating tool holder, the combination of shank and tool holding members loosely fitted one within the other for relative rotation, said members defining therebetween an annular space comprising outer and inner walls of non-circular cross-section and of such relative size that, upon predetermined relative rotation of said members, portions of such walls engage each other whereby to arrest further relative rotation of said members, and a resilient element in such space bonded to such outer and inner walls and constituting the sole means for connecting said members together and for yieldably opposing relative rotation of said members to a position with portions of such walls engaging each other.

4. In a floating tool holder, the combination of shank and tool holding members loosely fitted one within the other for relative rotation, said members defining therebetween an annular space comprising outer and inner walls of non-circular cross-section and of such relative size that, upon predetermined relative rotation of said members, portions of such walls engage each other whereby to arrest further relative rotation of said members, and a resilient element in such space bonded to such outer and inner walls and constituting the sole means for connecting said members together and for yieldably opposing relative rotation of said members to a position with portions of such walls engaging each other, such predetermined relative rotation being of a degree such that the walls of such space engage as aforesaid prior to shearing of the bonds between said resilient element and such walls.

5. In a floating tool holder, the combination of shank and tool holding members loosely fitted out of contact one within the other for relative axial, radial, angular, and rotative movements, said members defining therebetween an annular space comprising outer and inner walls of non-circular cross-section and of such relative size that, upon predetemined relative rotation of said members, portions of such walls engage each other whereby to arrest further relative rotation of said members, and a resilient element in such space engaging such outer and inner walls and yieldably opposing relative rotation of said members to a position with portions of such walls engaging each other.

6. In a floating tool holder, the combination of shank and tool holding members loosely fitted out of contact one within the other for relative axial, radial, angular, and rotative movements, said members defining therebetween an annular space comprising outer and inner walls of non-circular cross-section and of such relative size that, upon predetermined relative rotation of said members, portions of such walls engage each other whereby to arrest further relative rotation of said members, and a resilient element in such space bonded to such outer and inner walls and constituting the sole means for connecting said members together, for yieldably opposing relative rotation of said members to a position with portions of such walls engaging each other, and for yieldably opposing the remaining of the aforesaid relative movements of said members.

7. In a floating tool holder, the combination of shank and tool holding members loosely fitted one within the other out of contact with each other and defining therebetween an annular space comprising axially extending inner and outer walls of non-circular cross-section, said members being formed with opposed, axially spaced and radially disposed faces, and a resilient element of L-shaped radial cross-section interposed between said members and formed with an axially extending portion engaging such walls and a radially extending portion engaging such faces, said resilient element constituting the sole means for holding said members together and for yieldably opposing relative movements of said members.

8. In a floating tool holder, the combination of shank and tool holding members loosely fitted one within the other out of contact with each other and defining therebetween an annular space comprising axially extending inner and outer walls of non-circular cross-section, said members being formed with opposed, axially spaced and radially disposed faces, and a resilient element of L-shaped radial cross-section interposed between said members and formed with an axially extending portion bonded to such walls and a radially extending portion bonded to such faces, said resilient element constituting the sole means for securing said members together and for yieldably opposing relative axial, radial, angular, and rotative movements of said members.

9. In a floating tool holder, the combination of shank and tool holding members loosely fitted one within the other out of contact with each other and defining therebetween an annular space comprising axially extending inner and outer walls of non-circular cross-section, said members being formed with opposed, axially spaced and radially disposed faces, and a resilient element of L-shaped radial cross-section interposed between said members and formed with an axially extending portion engaging such walls and a radially extending portion engaging such faces, said resilient element constituting the sole means for holding said members together and for yieldably opposing relative movements of said members, said members being so formed that, upon relative movement thereof in a direction to move such faces axially toward each other, the radially extending portion of said resilient element can freely expand radially from between such faces.

WILLIAM H. EICHELMAN.

REFERENCES CITED

The following references are of record in the file of this patent:

UNITED STATES PATENTS

| Number | Name | Date |
|---|---|---|
| 1,222,466 | Railton | Apr. 10, 1917 |
| 1,346,245 | Palosky | July 13, 1920 |
| 2,016,154 | McWhirter | Oct. 1, 1935 |
| 2,250,448 | Edwards | July 29, 1941 |
| 2,392,039 | Gideon | Jan. 1, 1946 |

OTHER REFERENCES

American Machinist—Feb. 1, 1945, 279-16, (page 134) (Copy in Div. 52).